United States Patent
Svanholm et al.

(10) Patent No.: US 9,189,858 B2
(45) Date of Patent: Nov. 17, 2015

(54) DETERMINING COORDINATES OF A TARGET IN RELATION TO A SURVEY INSTRUMENT HAVING AT LEAST TWO CAMERAS

(75) Inventors: Set Svanholm, Sollentuna (SE);
Michael Vogel, Schleifreisen (DE);
Christian Grässer, Vallentuna (SE)

(73) Assignee: TRIMBLE AB, Danderyd (SE)

( * ) Notice: Subject to any disclaimer, the term of this patent is extended or adjusted under 35 U.S.C. 154(b) by 1442 days.

(21) Appl. No.: 12/735,805

(22) PCT Filed: Feb. 29, 2008

(86) PCT No.: PCT/EP2008/052531
§ 371 (c)(1),
(2), (4) Date: Nov. 2, 2010

(87) PCT Pub. No.: WO2009/106141
PCT Pub. Date: Sep. 3, 2009

(65) Prior Publication Data
US 2011/0043620 A1 Feb. 24, 2011

(51) Int. Cl.
*H04N 7/18* (2006.01)
*G06T 7/00* (2006.01)
(Continued)

(52) U.S. Cl.
CPC ................ *G06T 7/0065* (2013.01); *G01C 1/04* (2013.01); *G01C 11/06* (2013.01); *G01C 15/002* (2013.01)

(58) Field of Classification Search
CPC ........ G01C 1/04; G01C 15/002; G01C 11/06; G06T 7/0065
USPC .................... 348/135; 382/106, 154; 356/5.1; 702/150; 33/290
See application file for complete search history.

(56) References Cited

U.S. PATENT DOCUMENTS

| 5,642,285 A | 6/1997 | Woo et al. |
| 5,949,548 A | 9/1999 | Shirai et al. |

(Continued)

FOREIGN PATENT DOCUMENTS

| CN | 1727845 A | 2/2006 |
| CN | 101101210 | 1/2007 |

(Continued)

OTHER PUBLICATIONS

International Search Report.
(Continued)

*Primary Examiner* — Y Lee
*Assistant Examiner* — Richard Carter
(74) *Attorney, Agent, or Firm* — Kilpatrick Townsend & Stockton LLP

(57) ABSTRACT

A method is disclosed for determining coordinates of a target in relation to a surveying instrument wherein a first image is captured using a first camera in a first camera position and orientation, a target is selected by identifying at least one object point in the first image, and first image coordinates of the object point in the first image are measured. In at least one embodiment, a second image is captured using a second camera in a second camera position and orientation, the object point identified in the first image is identified in the second image, and second image coordinates of the object point in the second image are measured. Target coordinates of the target in relation to the rotation center of the surveying instrument are then determined based on the first camera position and orientation, the first image coordinates, the second camera position and orientation, the second image coordinates, and first and second camera calibration data. Furthermore, a surveying instrument for performing the method is disclosed.

27 Claims, 6 Drawing Sheets

(51) Int. Cl.
G01C 1/04 (2006.01)
G01C 11/06 (2006.01)
G01C 15/00 (2006.01)

(56) References Cited

U.S. PATENT DOCUMENTS

| | | | |
|---|---|---|---|
| 6,044,567 | A | 4/2000 | Feist |
| 6,147,598 | A | 11/2000 | Murphy et al. |
| 6,282,362 | B1 | 8/2001 | Murphy et al. |
| 6,384,902 | B1 | 5/2002 | Schneider |
| 6,411,372 | B1 | 6/2002 | Donath et al. |
| 6,453,569 | B1 | 9/2002 | Kumagai et al. |
| 6,559,931 | B2 | 5/2003 | Kawamura et al. |
| 6,688,010 | B1 | 2/2004 | Schwaerzler |
| 7,200,945 | B2 | 4/2007 | Endo |
| 7,218,384 | B2 | 5/2007 | Shirai et al. |
| 7,339,611 | B2 | 3/2008 | Marold et al. |
| 7,503,123 | B2 | 3/2009 | Matsuo et al. |
| 7,508,980 | B2 | 3/2009 | Otani et al. |
| 7,541,974 | B2 | 6/2009 | Scherzinger |
| 7,619,561 | B2 | 11/2009 | Scherzinger |
| 7,623,224 | B2 | 11/2009 | Vogel |
| 7,697,127 | B2 | 4/2010 | Vogel et al. |
| 7,697,749 | B2 | 4/2010 | Ogawa |
| 7,719,467 | B2 | 5/2010 | Norda et al. |
| 7,793,424 | B2 | 9/2010 | Laabs et al. |
| 7,908,752 | B2 | 3/2011 | Hertzman et al. |
| 7,930,835 | B2 | 4/2011 | Svanholm et al. |
| 8,897,482 | B2 | 11/2014 | Mein et al. |
| 2001/0050764 | A1* | 12/2001 | Shirai .................. 356/5.1 |
| 2002/0001406 | A1* | 1/2002 | Kochi et al. .......... 382/154 |
| 2002/0191839 | A1* | 12/2002 | Ito et al. ............... 382/154 |
| 2003/0048438 | A1 | 3/2003 | Kawamura et al. |
| 2004/0004706 | A1 | 1/2004 | Uezono et al. |
| 2004/0131248 | A1 | 7/2004 | Ito et al. |
| 2005/0057745 | A1 | 3/2005 | Bontje |
| 2005/0125142 | A1 | 6/2005 | Yamane |
| 2006/0013474 | A1 | 1/2006 | Kochi et al. |
| 2006/0017938 | A1 | 1/2006 | Ohtomo et al. |
| 2006/0021236 | A1 | 2/2006 | Endo |
| 2006/0167648 | A1* | 7/2006 | Ohtani .................. 702/150 |
| 2007/0008515 | A1 | 1/2007 | Otani et al. |
| 2007/0065004 | A1 | 3/2007 | Kochi et al. |
| 2007/0104353 | A1 | 5/2007 | Vogel |
| 2007/0141976 | A1 | 6/2007 | Shimakawa et al. |
| 2008/0075325 | A1* | 3/2008 | Otani et al. ........... 382/106 |
| 2008/0120855 | A1* | 5/2008 | Matsuo et al. ........ 33/290 |
| 2008/0123112 | A1 | 5/2008 | Marsh et al. |
| 2009/0109420 | A1 | 4/2009 | Kludas et al. |
| 2009/0138233 | A1 | 5/2009 | Kludas et al. |
| 2009/0153811 | A1 | 6/2009 | Braiman et al. |
| 2009/0262974 | A1 | 10/2009 | Lithopoulos |
| 2010/0037474 | A1 | 2/2010 | Hertzman et al. |
| 2010/0074532 | A1 | 3/2010 | Gordon et al. |
| 2010/0088910 | A1 | 4/2010 | Svanholm et al. |
| 2010/0092165 | A1 | 4/2010 | Cartoni et al. |
| 2010/0103431 | A1 | 4/2010 | Demopoulos |
| 2010/0141759 | A1 | 6/2010 | Scherzinger |
| 2010/0171377 | A1 | 7/2010 | Aicher et al. |
| 2010/0172546 | A1 | 7/2010 | Sharp |
| 2010/0174507 | A1 | 7/2010 | Vogel et al. |
| 2012/0057174 | A1 | 3/2012 | Briggs |
| 2012/0062868 | A1 | 3/2012 | Kludas et al. |
| 2012/0230668 | A1 | 9/2012 | Vogt |
| 2013/0197852 | A1 | 8/2013 | Grau et al. |
| 2015/0062309 | A1 | 3/2015 | Mein et al. |

FOREIGN PATENT DOCUMENTS

| | | |
|---|---|---|
| CN | 101101210 | 1/2008 |
| CN | 101101210 A | 1/2008 |
| DE | 144 967 | 11/1980 |
| DE | 19922321 C2 | 7/2002 |
| DE | 10 2007 030 784 | 1/2008 |
| EP | 0 971 207 | 1/2000 |
| EP | 0 997 704 | 5/2000 |
| EP | 1 139 062 | 10/2001 |
| EP | 1 607 718 | 12/2005 |
| EP | 1 655 573 | 5/2006 |
| EP | 1936323 A2 | 6/2008 |
| EP | 1944572 A1 | 7/2008 |
| JP | 4-198809 | 7/1992 |
| JP | 2000-131060 | 5/2000 |
| JP | 2005-017262 | 1/2005 |
| JP | 2007-147422 | 6/2007 |
| WO | WO 2004/057269 | 7/2004 |
| WO | WO 2005/059473 | 6/2005 |
| WO | 2007/031248 A2 | 3/2007 |
| WO | 2009/100774 A1 | 8/2009 |
| WO | 2009/103342 A1 | 8/2009 |
| WO | WO 2009/100728 | 8/2009 |
| WO | WO 2009/100773 | 8/2009 |
| WO | WO 2009/100774 | 8/2009 |
| WO | 2009/106141 A1 | 9/2009 |
| WO | 2010/080950 A1 | 7/2010 |

OTHER PUBLICATIONS

International Preliminary Report on Patentability and Written Opinion dated Apr. 15, 2010 issued in related application No. PCT/EP2008/052531.
International Search Report dated Nov. 13, 2008 in related application No. PCT/EP2008/001053.
International Search Report dated Nov. 12, 2008 in related application No. PCT/EP2008/058183.
International Search Report dated Nov. 6, 2008 in related application No. PCT/EP2008/058175.
Zhang et al.: "Photo Total Station System an Integration of Metric Digital Camera and Total Station" Conference on Optical 3-D Measurement Techniques (vol. I, pp. 176-182) Sep. 22, 2003.
Zhang, Z. "Determining the Epipolar Geometry and its Uncertainty: A Review." *International Journal of Computer Vision*, 27(2), 161-198, 1998.
U.S. Office Action dated Feb. 26, 2013 for co-pending U.S. Appl. No. 12/735,279.
U.S. Office Action dated Mar. 21, 2013 for co-pending U.S. Appl. No. 12/735,582.
Chinese Office Action dated Mar. 12, 2012 issued in corresponding Chinese Application No. 200880125829.7 and English translation thereof.
Chinese Office Action dated Jun. 13, 2013 for Chinese Application No. 200880125829.7.
Non-Final Office Action of Mar. 12, 2012 for U.S. Appl. No. 12/363,693, 17 pages.
Final Office Action of Sep. 9, 2012 for U.S. Appl. No. 12/363,693, 15 pages.
Non-Final Office Action of Aug. 16, 2013 for U.S. Appl. No. 12/363,693, 12, pages.
Final Office Action of May 16, 2014 for U.S. Appl. No. 12/363,693, 15 pages.
Notice of Allowance of Jul. 24, 2014 for U.S. Appl. No. 12/363,693, 15 pages.
Non-Final Office Action of Jul. 6, 2015 for U.S. Appl. No. 14/523,677; 15 pages.

* cited by examiner

DETERMINING COORDINATES OF A TARGET IN RELATION TO A SURVEY INSTRUMENT HAVING AT LEAST TWO CAMERAS

CROSS-REFERENCE TO RELATED APPLICATIONS

This application is a U.S. National Stage of International Application No. PCT/EP2008/052531, filed Feb. 29, 2008.

TECHNICAL FIELD

The present invention relates to surveying instruments, such as total stations. More particularly, the present invention relates to a method for determining coordinates of a target in relation to a surveying instrument having at least two cameras for capturing a field of view and at least one identified target point within the field of view.

BACKGROUND

In surveying, the use of a camera in a geodetic instrument may provide for improved user convenience and new functions. Particularly, a view such as an image or a video feed provided by the camera and shown on a display of the instrument may be used for assisting target selection and for providing the user with an overview of potential points of interest.

One apparent difference between a traditional eyepiece and a video image shown on a display, is that the display image may have an active overlay of information. Various information may be given together with the captured image to facilitate instrument usage.

For a general background of a geodetic instrument comprising a camera for capturing an image or a video feed of the view towards which the geodetic instrument is aimed, reference is made to WO 2005/059473.

Surveying instruments of this kind, i.e. which includes a camera, are sometimes referred to as video-theodolites.

In a conventional geodetic instrument, electronic distance measuring (EDM) may alternatively or additionally be used, where a modulated light beam is emitted towards a target, and light reflected against the target is subsequently detected at the geodetic instrument. Processing of the detected signal enables determination of distance to the target by means of e.g. time of flight (TOF) measurements or phase modulation techniques. Using a TOF technique, the time of flight of a laser pulse from the geodetic instrument to a target and back again is measured and distance can thus be calculated. Using a phase modulation technique, light of different frequencies is emitted from the geodetic instrument to the target, whereby reflected light pulses are detected and the distance is calculated based on the phase difference between emitted and received pulses.

SUMMARY

In the field of video-theodolites, or more generally for geodetic instruments provided with a camera, problems arise when the camera center and the instrument rotation center do not coincide. Directions to targets from the camera center determined based on the camera image will normally not apply directly as directions to the target from the instrument rotation center.

Further, at a close range distance of approximately 0-25 m from the target, EDM-type geodetic instruments have limitations due to target spot size, low signal strength owing to imperfect optic configuration, optical cross talk, measurement errors, etc.

The present invention provides a method for determining, in relation to a surveying instrument, target coordinates of points of interest, or target, identified in two images captured by two different cameras in the surveying instrument.

Throughout this application, the terms "geodetic instrument", "surveying instrument" and "total station" will be used interchangeably.

When the camera center or perspective center and the rotation center of a surveying instrument are non-coincident (eccentric), it is generally not possible to directly determine a correct direction from the rotation center towards an arbitrary point identified or indicated in an image captured by the camera. In other words, if a direction from a camera to a target is determined from an image captured by the camera, the direction towards the target from the rotation center that is not coinciding with the camera center, will typically not be adequately determined by approximation using the direction from the camera. Only if the distance to the point of interest is known would it be possible to derive the correct direction from the rotation center to the target from the image. It is thus desirable to determine coordinates of the target with respect to the rotational center of the surveying instrument.

The present invention provides a method for determining coordinates of a target in relation to a surveying instrument wherein a first image is captured using a first camera in a first camera position and orientation, a target is selected by identifying at least one object point in the first image, and, first image coordinates of the at least one object point in the first image are measured. A second image is captured, preferably simultaneous with the first image, using a second camera in a second position and orientation, the at least one object point identified in the first image is identified also in the second image, and second image coordinates of the at least one object point in the second image are measured. Finally, coordinates of the target in relation to the rotation center of the surveying instrument are determined based on the first camera position and orientation, the first image coordinates, the second camera position and orientation, the second image coordinates, and camera calibration data.

The present invention makes use of an understanding that the coordinates of the point of interest from the surveying instrument can be determined by using the eccentricity of cameras in the surveying instrument for capturing a respective image from the cameras, the cameras being in known camera positions and orientations, the positions and orientations being different for the respective camera. Identification of an object point and the coordinates thereof in the two images together with camera calibration data it thus enabled. When target coordinates with respect to the rotational center of the instrument have been determined, distance from the rotation center to the target can be determined. However, target coordinates may be used for other purposes than determining distance. For instance, it may be useful to measure coordinates of the total station relative to a ground reference point very accurately for surveying instrument stationing. Advantageously, target coordinates are determined in relation to the rotational center of the surveying instrument. Of course, it would alternatively be possible to use the total station as "origin" and express coordinates of the ground reference point relative to the total station.

The present invention also provides a total station which comprises various means for carrying out the above-described method.

Further, the dual camera solution provided by the present invention is highly advantageous since it may be combined in a surveying instrument with conventional EDM. Thus, dual camera targeting may be used at close range (e.g. in the range of about 0-25 m), while EDM may be used at far range (>25 m).

In addition, the present invention can be implemented in a computer program that, when executed, performs the inventive method in a surveying instrument. The computer program may, for example, be downloaded into a surveying instrument as an upgrade. As will be understood, the inventive method can be implemented for a surveying instrument using software, hardware or firmware, or a combination thereof, as desired in view of the particular circumstances.

BRIEF DESCRIPTION OF THE DRAWINGS

In the following detailed description, reference is made to the accompanying drawings, on which.

DETAILED DESCRIPTION

Figure 1:
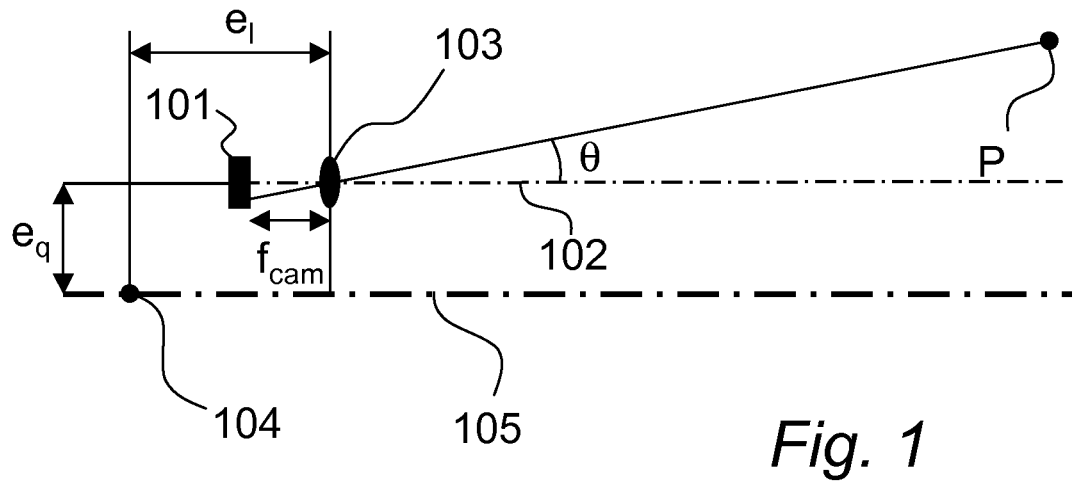
FIG. 1 is a schematic diagram showing, from the side, a situation for a surveying instrument having a camera that is eccentric to the instrument rotation center.

FIG. 1 illustrates schematically a situation where an object point relating to a target P is identified in an image captured by a camera in a surveying instrument. In the figure, there is shown a camera sensor 101, such as a CMOS camera or a CCD, for capturing an image centered about a camera axis 102. An image is formed on the camera sensor 101 by means of an optical system 103. The surveying instrument can be aimed at a desired target by rotation over horizontal and vertical angles about a rotation center 104 of the instrument. As illustrated in the figure, the optical system 103 for the camera is eccentric with respect to the rotation center of the instrument (separation $e_q$ and $e_l$, respectively, from the rotation center of the instrument). The camera axis 102 (center line for the camera view) is thus not collinear with the optical axis 105 of the instrument (i.e. optical line of sight), as illustrated in the figure. The camera optical axis 102 should ideally be perpendicular to the plane of the camera sensor 101 and the optical system 103 should be free from distortions or aberrations, which is not the case in practice.

Figure 3:
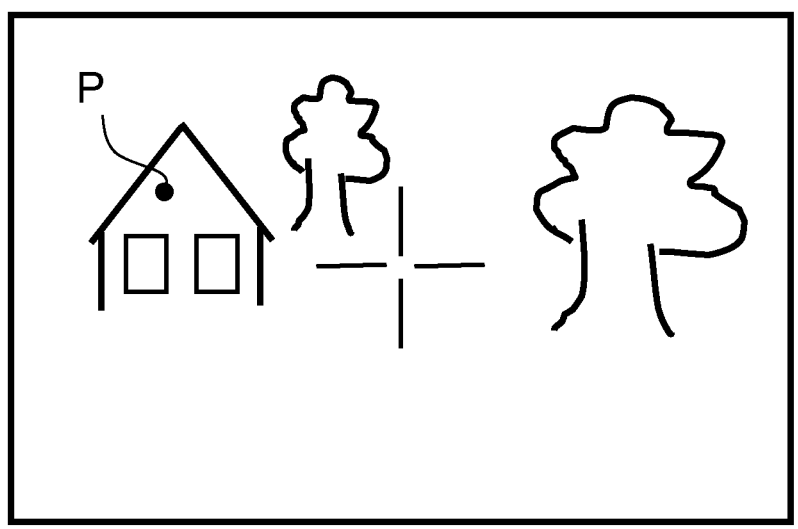
FIG. 3 schematically shows an image or video frame that may be captured by the camera and presented on a screen of the instrument.

FIG. 3 schematically shows an image captured by the camera. Such image may be presented to an operator using the surveying instrument, such that the operator may select at least one image object point of a target P by clicking in the image or otherwise indicating the desired object point. In prior art surveying instruments, the aiming at an exact point is very time consuming and tedious, in particular when compared to the present invention where an operator simply clicks in the image. The optical axis (i.e. the optical line of sight) of the instrument is directed roughly towards the image center, which is indicated by the cross-hair in FIG. 3.

For determining the direction from the surveying instrument towards a selected target P, there are a number of functions implemented in the instrument. For example, if the direction to a target from the camera is expressed as horizontal and vertical angles $(\theta^x, \theta^y)$ from the camera axis, a function is provided in the instrument (or in an associated control unit) that determines the direction to a target from the camera by calculating the horizontal and the vertical angles $(\theta^x, \theta^y)$ based on pixel coordinates in the image or video feed captured by the camera. Hence, the function $f$ that calculates the horizontal and vertical angles $(\theta^x, \theta^y)$ based on image pixels can be described as $$(\theta^x, \theta^y) = f(x, y, C)$$

where x, y are the number of pixels (or more generally, pixel coordinates) of the desired target in the coordinate system of the camera, and C are calibration factors to be determined for each system. The calibration factors C include details about the camera, such as but not limited to, its eccentricity $e_q$ and $e_l$ and its focal length $f_{cam}$ (FIG. 1). For a general description of how to calculate horizontal and vertical angles based on an image captured by a camera in the instrument, reference is made to the above-mentioned WO 2005/059473.

Figure 2:
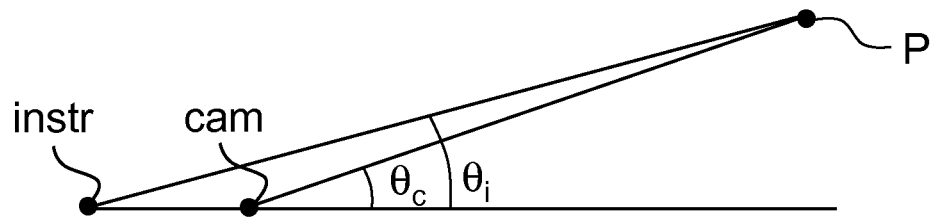
FIG. 2 schematically shows, from above, how the eccentricity between the camera and the instrument center leads to angle differences relative to an object point also in a situation where the instrument sight line and the camera line of sight are coaxial.

In order to find the direction to a target captured with an eccentric camera from an instrument using one image, e.g. for aiming the instrument towards the desired target P, it is necessary to know the distance to the target. To this end, it may be useful to study the schematic diagram shown in FIG. 2. FIG. 2 is a plan view taken from above, and illustrates the angles between the current line of sight (optical as well as EDM) and the desired target (P) for both the camera (cam) and the instrument (instr) center. The camera calibration data are used for determining the camera angle $\theta_c$ to the object point P, but the instrument angle $\theta_i$ to the object point P will be slightly different as indicated in FIG. 2. Hence, in order to find the direction to a target from an instrument using one image, e.g. for aiming the instrument towards the desired object point P, it is necessary to know the distance to the target. It should be understood that FIG. 2 is only a schematic illustration.

However, if two images are captured from a pair of cameras in a surveying instrument, where a first image is captured using a first camera in a first camera position and orientation, said first camera position being eccentric to the rotation center of the surveying instrument, and a second image is captured preferably simultaneously using a second camera in a second camera position and orientation, said second position typically but not necessarily being eccentric to the rotation center of the surveying instrument, at least one object point corresponding to a target is identified in the first image and in the second image, and image coordinates for the object point in the first image and second image are measured, coordinates of the target with respect to the rotation center of the surveying instrument can be determined using camera calibration data.

Even though the main object of surveying typically is to obtain the coordinates of the target with respect to the rotation center of the surveying instrument, determining the direction towards the target from the rotation center of the surveying instrument may also be useful e.g. for aiming the surveying instrument towards the target for subsequent distance measuring. Further, determining the target distance from the rotation center of the surveying instrument may also be useful e.g. for determining a sample interval for a distance measuring instrument using time of flight measurements, focusing capability of EDM, and auto focus for a further camera or for a user.

Figure 4:
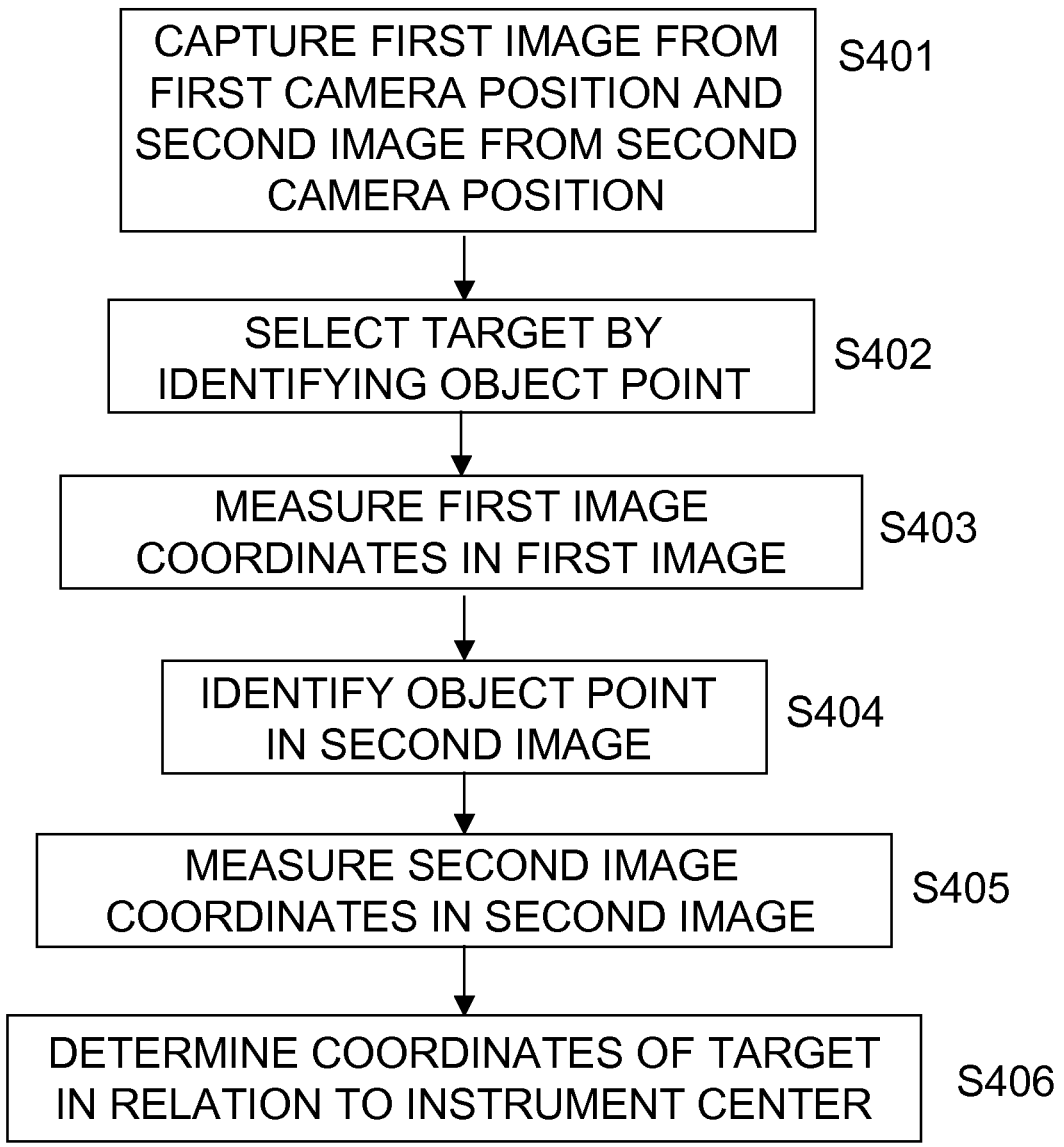
FIG. 4 is a general outline of the inventive method.

General steps of the method according to the present invention are outlined in FIG. 4. The method is performed in a surveying instrument comprising at least two cameras and starts with capturing in a step S401 of a first image using a first camera in a first camera position and orientation, the first camera position being eccentric to the rotation center of the surveying instrument. Simultaneously, a second image is captured using a second camera in a second camera position and orientation, which second camera position also is eccentric to the rotation center of the surveying instrument, The method then proceeds with performing target selection in a step S402. At least one object point relating to the target is identified in the first image which may be a snapshot or a frame of a video feed captured by the camera. For example, the target may be identified by selection by an operator clicking on a screen showing the image captured by the first camera, or in any other suitable way of indicating the selected target with respect to the captured image. It is also envisaged that the target identification can be made in other ways, such as using prisms located at the target, edge detection, identification of target features (e.g. arrows), etc. In order to facilitate the target selection, it is preferred that it is indicated in the screen image the point at which the instrument line of sight is currently aimed, and for which point coordinates are measured, for example using a cross-hair, a dot or similar. It should be noted that as long as the object point is present in both images, target coordinates can be determined. It is not strictly necessary to make a target identification on the screen to determine the target coordinates.

Once the target has been selected by identification of the object point in the first image in the step S402, first image coordinates of the object point in the first image are measured in a step S403.

The object point identified in the first image is identified in a step S404 in the second image. For example, the object point may be identified by selection by an operator clicking on a screen showing the image captured by the second camera, or preferably by means of digital image processing.

Once the object point has been identified in the second image in step S404, second image coordinates of the object point in the second image are measured in a step S405.

The first camera position and orientation is determined by taking into account the horizontal and vertical direction of the first camera center to the instrument rotation center, e.g. first camera calibration data in the form of eccentricity parameters $e_q$ and $e_t$, such that first camera coordinates are related to surveying instrument coordinates. Further, as will be discussed in the following, other calibration data can be considered, for example camera position independent parameters such as the so-called camera constant representing distance between the camera center and image plane and/or parameter of distortion, which depends on the image position. Similarly, the second camera position and orientation is determined by taking into account the horizontal and vertical direction of the second camera center to the instrument rotation center, e.g. second camera calibration data in the form of eccentricity parameters $e_q$ and $e_t$, such that second camera coordinates are related to surveying instrument coordinates.

Finally, coordinates of the target in relation to the rotation center of the surveying instrument are thus determined in a step S406 based on the first camera position and orientation, the first image coordinates, the second camera position and orientation, the second image coordinates, and respective camera calibration data.

Assuming that a scan of a target is desired, i.e. the three dimensional appearance of a target is of interest, a similar procedure as the one shown in FIG. 4 is undertaken. First, the surveying instrument is pointed in the direction of the target and a number of images are captured with both cameras while sweeping the surveying instrument over the target in order to be able to depict the complete target. If a large number of images are captured, at least one object point relating to the target is identified in each first camera image by using image analysis software in order to aid the surveying instrument operator, and first image coordinates of the object point in the first image are measured. However, a number of object points is typically identified. The object point(s) identified in each first image is further identified in each corresponding second image, and second image coordinates of the object point in the respective second image are measured. Thereafter, coordinates of the target in relation to the rotation center of the surveying instrument are determined based on the first camera position and orientation, the first image coordinates, the second camera position and orientation, the second image coordinates, and respective camera calibration data. As a result, the coordinates determined from the respective pair of images can be used to form a three-dimensional representation of the scanned target.

Figure 5:
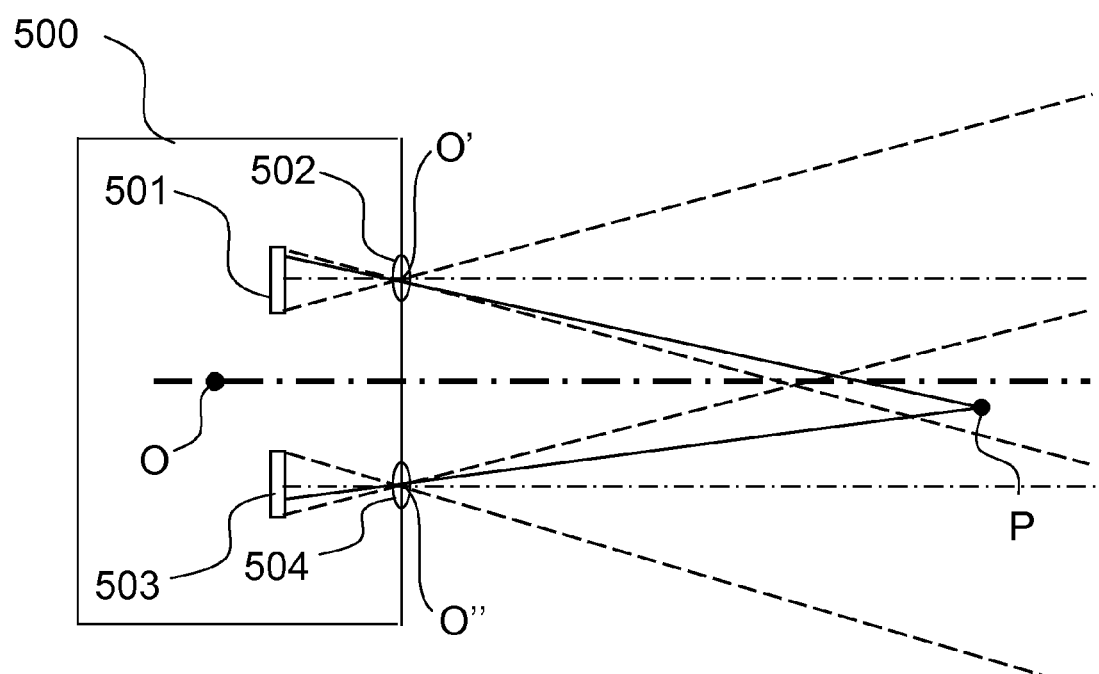
FIG. 5 is a schematic diagram showing an implementation of a surveying instrument according to the invention having two cameras that are eccentric to the instrument rotation center and each with a line of sight parallel with the line of sight of the instrument. Images are captured using the two different cameras.

FIG. 5 is a schematic diagram showing an implementation of a surveying instrument according to the invention having two cameras. For simplicity, the surveying instrument is shown in two dimensions, and can be seen as either top or side views. However, it will be apparent to a skilled person how the teachings of the invention should be expanded to the three-dimensional case.

The surveying instrument 500 comprises a first camera comprising a first camera sensor 501 and a first optical system 502. The first camera has a first camera center, or first projection center, that has a first camera position O' eccentric to the location O of the rotation center of the instrument 500 and having a first camera orientation. The surveying instrument 500 further comprises a second camera comprising a second camera sensor 503 and a second optical system 504. The second camera has a second camera center, or second projection center, that has a second camera position O" eccentric to the location O of the rotation center of the instrument 600 and having a second orientation. Each camera has a line of sight that is approximately parallel with the line of sight of the instrument. The cameras may have an arbitrary eccentric location with respect to the instrument rotation center.

A first image is captured by the first camera sensor 501 with the first camera center located in a first camera position O' eccentric to the location O of the rotation center of the surveying instrument 500 and having a first camera orientation. A target in position P is selected by identifying at least one object point in a position P' in the first image. Once the target has been selected by identification of the object point in the first image, first image coordinates of the object point in the first image are measured.

A second image is captured, preferably but not necessarily simultaneous as the first image, by the second camera sensor 502 in a second camera position O" eccentric to the location O of the rotation center of the surveying instrument 500 and having a second camera orientation. The at least one object point identified in the first image is identified also in the second image in a position P'''. Once the object point has been identified in the second image, second image coordinates of the object point in position P''' in the second image are measured.

Finally, coordinates of the target P in relation to the rotation center O of the surveying instrument are determined based on the first camera position and orientation, the first image coordinates, the second camera position and orientation, the second image coordinates, and first and second camera calibration data. Thus, a first image and a second image are captured by the first camera and the second camera, respectively. Image coordinates for the object point are measured in the images and target coordinates of the target in relation to the instrument rotation center can be determined using respective camera calibration data.

FIG. 5 illustrates an ideal camera setup, since the line of sight of both cameras is parallel. It should be mentioned that the cameras could have a diverging or converging angle with respect to each other.

Figure 6:
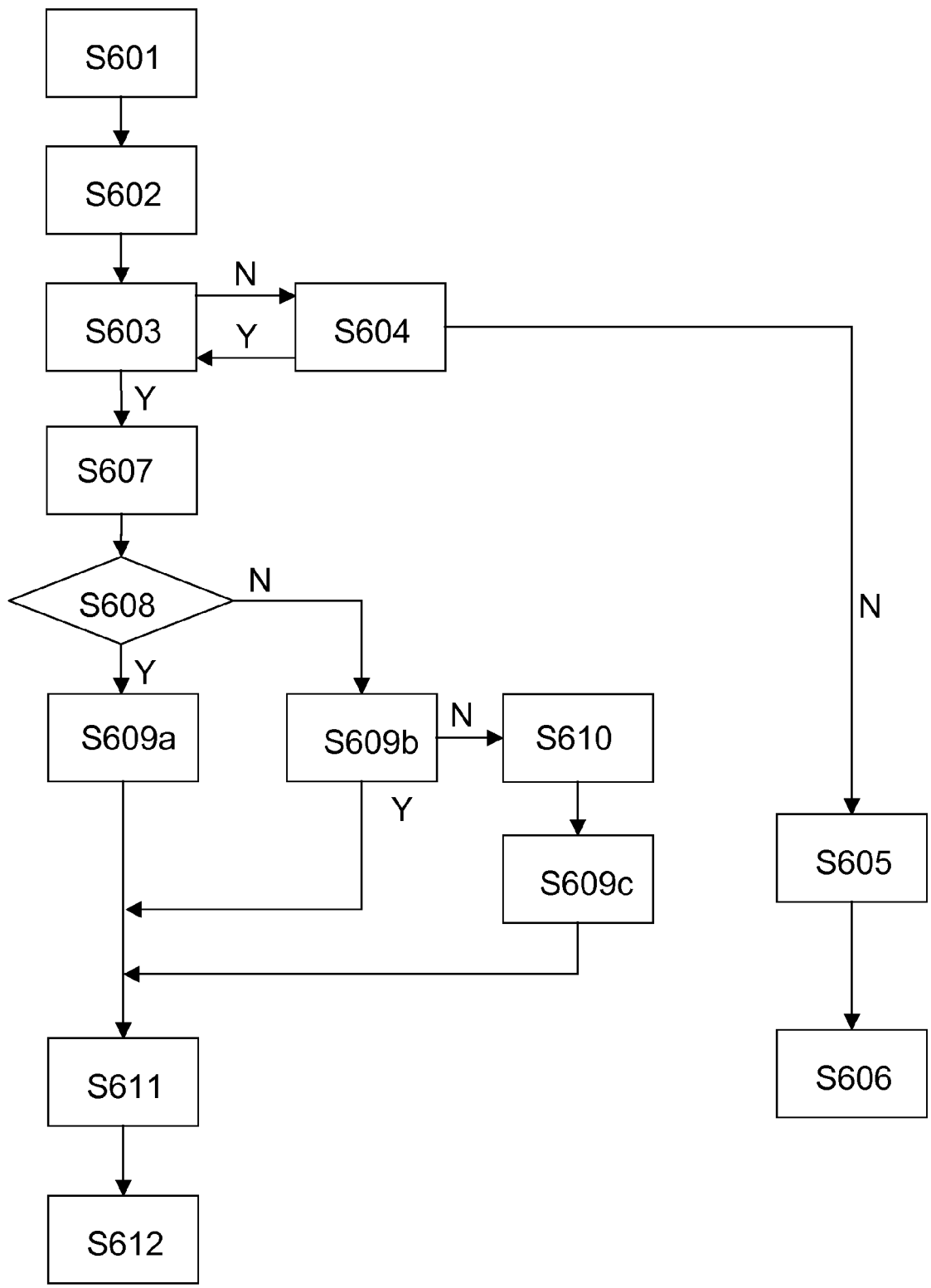
FIG. 6 is an outline of an implementation of the inventive method.

FIG. 6 is an outline of an implementation of the inventive method performed in a surveying instrument comprising two cameras such as schematically disclosed in FIG. 5. Input to the method are camera calibration data comprising camera and surveying instrument parameters. The method starts in a step S601 with capturing of a first image using the first camera in a first camera position and orientation, said first camera position being eccentric to a rotation center of the surveying instrument, and with simultaneous capturing of a second image using the second camera in a second camera position and orientation also being eccentric to the rotation center. In a step S602 a target is selected by identifying an object point in the first image corresponding to the target. For example, the target may be identified by selection by an operator clicking on a screen showing the image captured by the camera. Furthermore, image coordinates for the object point in the first image are measured.

After the object point has been identified, it is determined in a step S603 if the object point can be identified using image processing and recognition software. If it cannot it is determined if a pattern in the vicinity of the point is detectable. If this is not the case the uncertainty is displayed in a step S605 and suitable alternative method is used in a step S606.

Figure 7:
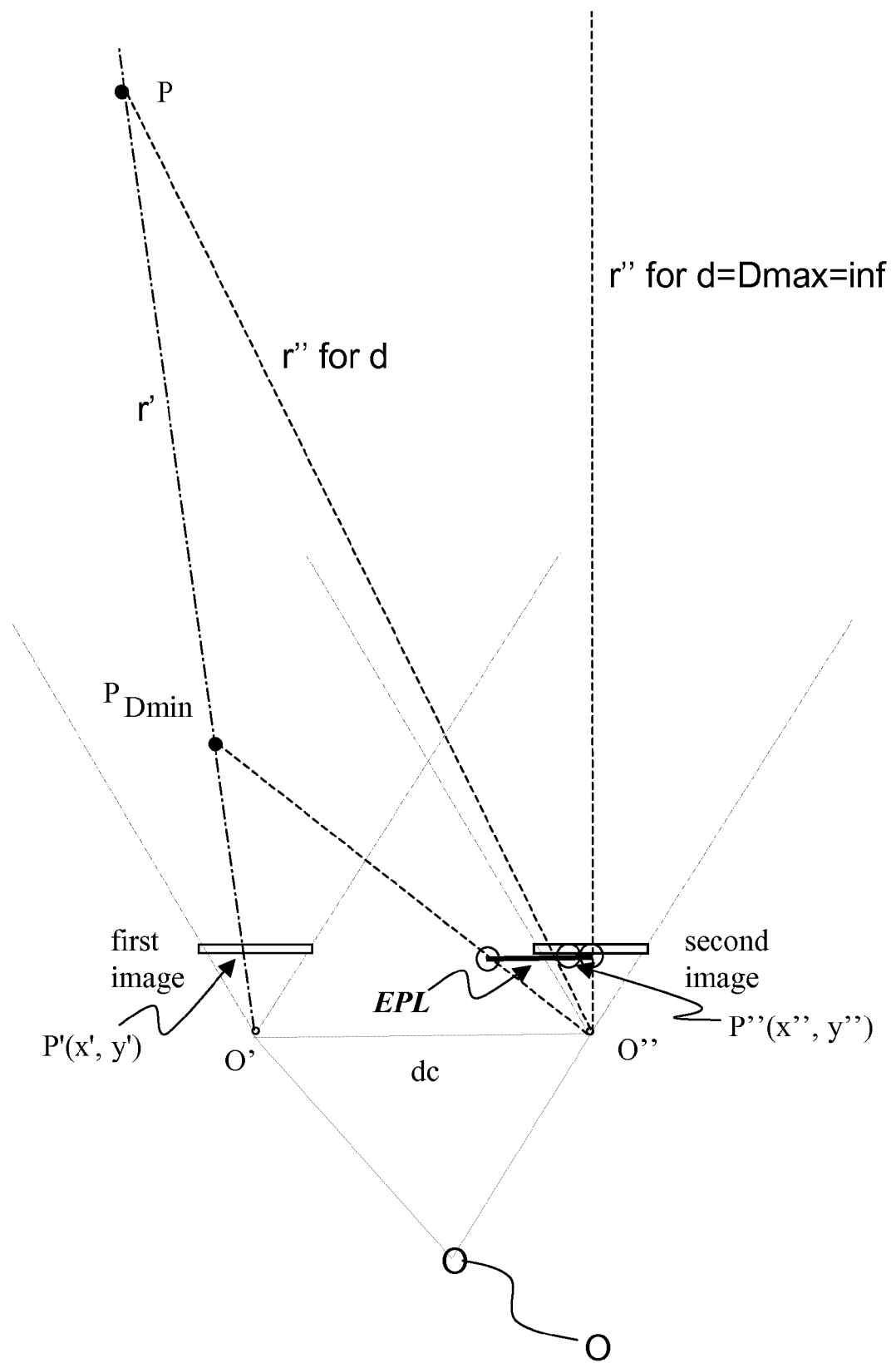
FIG. 7 schematically illustrates the capturing of a respective image from two cameras, and identification of an object point along a section of an epipolar line in the second image.

If a pattern can be detected or if the point can be identified by software in the first image in step S603, the so called epipolar line can be calculated in a step S607 using the first camera position and orientation, the second camera position and orientation, the first image coordinates, first and second camera calibration data and a minimum distance $D_{min}$ (see FIG. 7). Then it is determined in a step S608 if the epipolar line is completely inside the second image. If the epipolar line is partly outside the second image the algorithm in step S609b assumes a maximum distance $D_{max}$ (see FIG. 7) and searches for the object point along the portion of the epipolar line that is within the second image. If the point can not be identified, a rotation is performed in step S610, which is calculated from epipolar line data, the second camera position and orientation and second camera calibration data. The rotation has as an effect that the epipolar line is located inside the second image. A revised second image will be captured with the second camera, such that the object point can be identified in step S609c. If in step S608 the epipolar line is completely inside the second image, the object point is identified in step S609a by searching along the epipolar line in the second image. For example, the object point may be identified by selection by an operator clicking on a screen showing the second image, or preferably by means of digital image processing.

Once the object point has been identified in the second image, second coordinates of the object point in the second image are measured in a step S611. Coordinates of the target in relation to the rotation center of the surveying instrument are determined based on the first camera position and orientation, the first image coordinates, the second camera position and orientation, the second image coordinates, and first and second camera calibration data. A target direction from the rotation center of the surveying instrument is determined based on the determined target coordinates in relation to the rotation center of the surveying instrument. That is, the coordinates of the target are expressed in relation to the coordinate system of the surveying instrument. Hence, the target coordinates are typically related to a coordinate system having its origin at the rotation center of the surveying instrument.

In an optional step S612, if distance to target is a desired parameter, the distance from the instrument rotation center to the target may be determined based on the target coordinates in relation to the rotation center of the surveying instrument.

FIG. 7 schematically illustrates the capturing of a respective image from two cameras and identification of an object point along a section of an epipolar line in the second image.

The surveying instrument of FIG. 7 comprises two cameras. Each camera has a camera center, or projection center, that is eccentric to the location O of the rotation center of the instrument.

A first image is captured by the first camera, when the first camera center is located in a first position O' eccentric to the location O of the rotation center of the surveying instrument and the first camera having a first camera orientation. A target in position P is selected by identifying an object point in a position P'(x', y') in the first image.

The distance between the first camera and the second camera is denoted $d_c$. A second image is captured by the second camera, the second camera center being located in the second position O'' eccentric to the location O of the rotation center of the surveying instrument and the second camera having the second camera orientation. The object point identified in the first image is identified in the second image in a position P''(x'', y'').

The so called collinearity equations are used to estimate the coordinates of P. For a background of the deriving of the collinearity equations and of calibration of a camera reference is made to WO 2005/059473.

The measured coordinates P' in the first image can be defined by the equations:

$$x' = x_0 - c_K \frac{r_{11'}(X - X_{0'}) + r_{21'}(Y - Y_{0'}) + r_{31'}(Z - Z_{0'})}{r_{13'}(X - X_{0'}) + r_{23'}(Y - Y_{0'}) + r_{33'}(Z - Z_{0'})} + \Delta x$$

$$y' = y_0 - c_K \frac{r_{12'}(X - X_{0'}) + r_{22'}(Y - Y_{0'}) + r_{32'}(Z - Z_{0'})}{r_{13'}(X - X_{0'}) + r_{23'}(Y - Y_{0'}) + r_{33'}(Z - Z_{0'})} + \Delta x$$

The measured coordinates P''' in the second image can be defined by the equations:

$$x'' = x_0 - c_K \frac{r_{11''}(X - X_{0''}) + r_{21''}(Y - Y_{0''}) + r_{31''}(Z - Z_{0''})}{r_{13''}(X - X_{0''}) + r_{23''}(Y - Y_{0''}) + r_{33''}(Z - Z_{0''})} + \Delta x$$

$$y'' = y_0 - c_K \frac{r_{12''}(X - X_{0''}) + r_{22''}(Y - Y_{0''}) + r_{32''}(Z - Z_{0''})}{r_{13''}(X - X_{0''}) + r_{23''}(Y - Y_{0''}) + r_{33''}(Z - Z_{0''})} + \Delta y$$

The following parameters are known from calibration:

$X_0$; $Y_0$; $Z_0$: coordinates from camera position, '=first image; "=second image.

$r_{ij}$: elements from rotation matrix (i=1 ... 3; j=1 ... 3), '=first image; "=second image.

$x_0$; $y_0$: coordinates from the principle point (constant, independent of camera position)

$c_K$: camera constant (constant, independent of camera position)

$\Delta x$, $\Delta y$: parameter of distortion. The distortion is known as a polynomial of a higher degree. The distortion depends on the image position and is independent of the camera position.

All parameters are measured or known from camera calibration except from X, Y, Z which are the coordinates of P. Hence, there are three unknowns and four equations. X, Y, Z can be determined with a least square method. It should be noted that there is no limitation to two images to estimate the location of point P, but at least two images are necessary. Hence, two or more images may be used.

It should be noted that once the target has been selected by identification of the object point in the first image, a first direction r' to the target from the position O' of the first camera center can determined. It should further be noted that the camera constant and parameter of distortion are individual parameters for each camera, i.e. the calculations for the first image use first camera calibration data while the calculations for the second image use second camera calibration data.

Using this first direction r' together with a maximum distance $D_{max}$ (which may be selected as infinity), and a minimum distance $D_{min}$ (which may be selected as a single base distance $d_c$) along the direction r', a section of r' can then be transformed into a section of a so called epipolar line EPL in the second image on which the object point should be located in the second image. Hence, if a pattern has been recognized in the first image around the position P' of the object point in the first image, this pattern may be recognized in the second image, e.g. by means of automatic image processing, by searching along the section of the epipolar line in the second image or in an area around that section. If in alternative, an operator is to identify the target in the second image, the identification can be simplified by graphical indication of the section of the epipolar line in the second image.

In a special case, the object point P may be so close to the instrument (but not closer than $D_{min}$) that it is not visible in the second image. The result is that the epipolar line extends the image for this close object point. A rotation of the instrument and revised second image capturing is needed. The rotation angle is determined by the first camera position and orientation, the first image coordinates P'(x', y'), the second camera position and orientation, the first and second camera calibration data and $D_{min}$. A revised second image is captured with the second camera. It is thus possible to search along the epipolar line for the object point in the revised second image.

Figure 8:
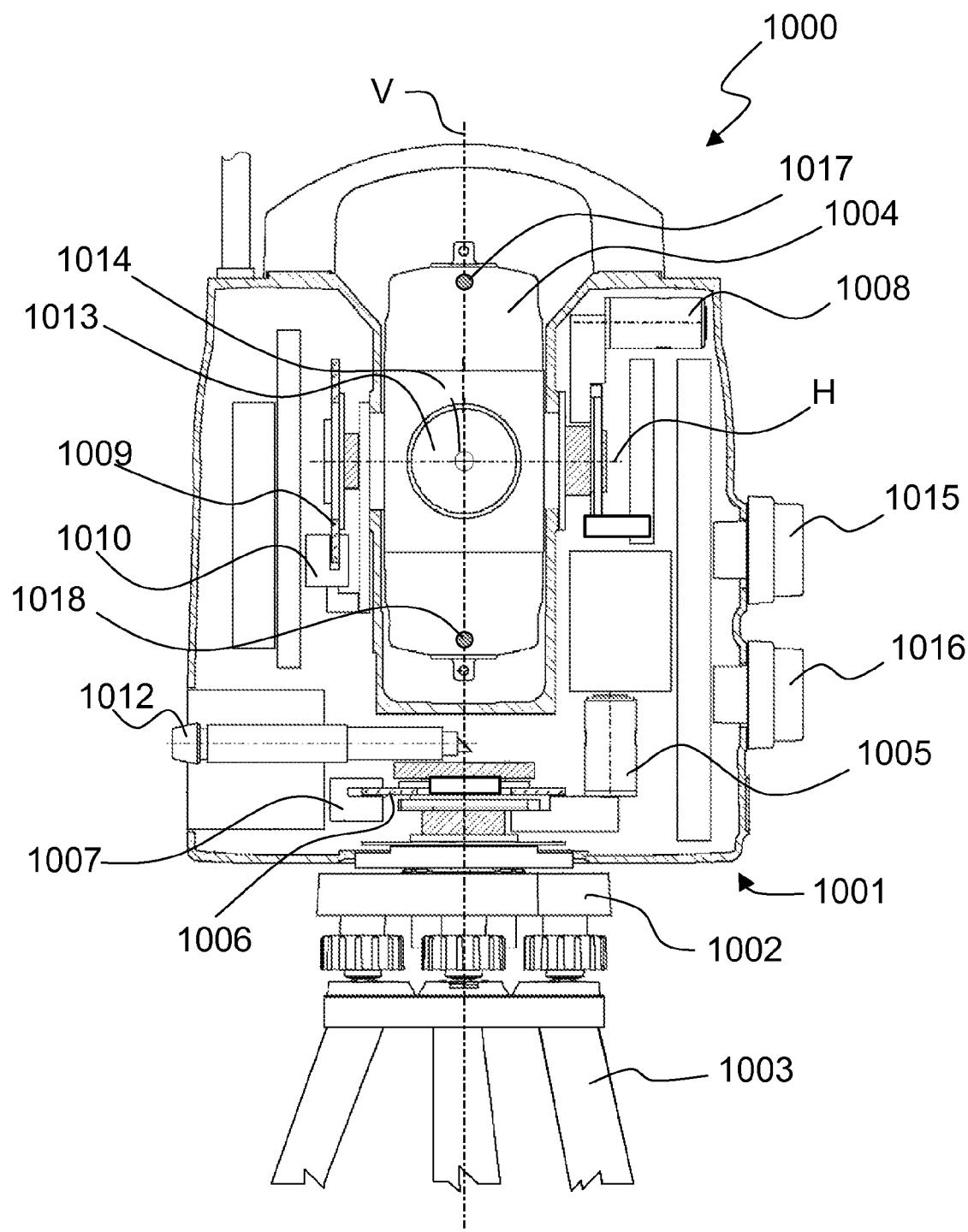
FIG. 8 shows schematically a geodetic instrument according to the present invention.

In FIG. 8, there is shown one example of a total station according to the present invention. In many aspects, the total station comprises features known from previous instruments. For example, the total station 1000 shown in FIG. 8 comprises an alidade 1001 mounted on a base 1002, and has a mounting support structure in the form of a tripod 1003. The alidade 1001 can be rotated about a vertically oriented rotation axis V, in order to aim the instrument in any desired horizontal direction. In the alidade, there is arranged a center unit 1004, which can be rotated about a horizontally oriented rotation axis H, in order to aim the instrument in any desired vertical direction. Measurements made using the total station 1000 are typically related to an origin of coordinates located at the intersection between the vertically oriented and the horizontally oriented rotation axes V and H.

For rotation of the alidade about the vertically oriented rotation axis to aim the instrument in any desired horizontal direction, there is provided drive means 1005. The rotational position of the alidade 1001 is tracked by means of a graduated disc 1006 and a corresponding angle encoder or sensor 1007. For rotation of the center unit 1004 about the horizontally oriented rotation axis, there are provided similar drive means 1008, graduated disc 1009 and sensor 1010. Moreover, the instrument has an optical plummet 1012, which gives a downwards view along the vertically oriented rotation axis. The optical plummet is used by the operator to center or position the instrument above any desired point on the ground.

As mentioned above, the instrument line of sight is centered at the intersection between the vertical and the horizontal rotation axes, and this can be seen in the figure where these axes cross in the center of a telescope 1013 in the center unit 1004.

In the telescope, there is provided a light source 1014, such as a laser pointer. Preferably, the light source is coaxial with the telescope, even though it could be placed elsewhere such that it instead is eccentric with the telescope. It should be understood that light sources having other wavelengths, e.g. light being invisible to the human eye, may be used depending on the responsivity of the cameras. The light source can be used for performing EDM, but can also, as will be discussed in the following, be used for indicating an object to be targeted. In the center unit, two cameras 1017, 1018 are further arranged for capturing an image or a video feed generally in the direction of the instrument line of sight. However, as shown, the cameras 1017, 1018 are eccentric from the center of the telescope 1013; but could be located in many different positions than what is shown in FIG. 10. The instrument also comprises a display device for showing the image captured by the cameras. The display may be an integral part of the instrument, but more preferably, the display is included in a removable control panel that can be used for remote control of the instrument via short range radio. It is even conceivable that the instrument is fully remote controlled, wherein the display may be in the form of a computer screen located far away from the total station, and wherein information to and from the instrument are transferred over a wireless computer or radio telephone network.

The instrument can also be manually operated for aiming towards a desired target using vertical and horizontal motion servo knobs 1015 and 1016.

The cameras of the instrument are operable to capture images from different positions and orientations eccentric to a rotation center of the surveying instrument.

Advantageously, the light source 1014, being e.g. a laser pointer, can be used to facilitate identification of a target object point. In analogy with the method described in the above, a first image is captured using a first camera in a first camera position and orientation, the first camera position being eccentric to the rotation center of the surveying instrument. Simultaneously, a second image is captured using a second camera in a second camera position and orientation, which second camera position also is eccentric to the rotation center of the surveying instrument. In this particular embodiment, while the first two images are captured, the laser pointer is turned on to illuminate the target, thus creating a distinct target object point. Note that the light of the laser pointer may be concentrated into a small point, but can alternatively be arranged to produce a light pattern or structure. Then, another two images are captured with the laser pointer being turned off. The first image of the first camera is subtracted from the second image of the first camera (or vice versa), and a similar procedure is undertaken for the second camera, in order to produce a difference image for the first camera and a difference image for the second camera. Using the first camera difference image, an object point relating to the target is identified and image coordinates of the object point in the first difference image are measured. Then, the object point identified in the first difference image is identified in the second difference image, and image coordinates of the object point in the second difference image are measured. Finally, coordinates of the target in relation to the rotation center of the surveying instrument are determined based on the first camera position and orientation, the image coordinates of the first difference image, the second camera position and orientation, the image coordinates of the second difference image, and respective camera calibration data.

According to the present invention, the instrument further comprises means for identifying an object point corresponding to a selected target in the displayed image; means for determining, based on the position of the object point in the displayed images, directions toward the target from the cameras in different positions; means for measuring image coordinates of the object point in the displayed images, and means for determining target coordinates of the target in relation to the rotation center of the surveying instrument, based on the first camera position and orientation, the first image coordinates, the second camera position and orientation, the second image coordinates, and first and second camera calibration data.

The means for identifying the object point in the captured image may take the form of a cursor that can be moved across the display. Alternatively, the display may be a touch display, where the object point is identified by simply clicking or tapping on the display. This is preferred for the identification of the object point in the first image.

The means for identifying the object point may include further functionality implemented in the form of image processing software. In such case, the further functionality would be that object points may be identified based on certain features in the captured image, for example markers or patterns located at the desired target. For example, an object point identified in a first image may be automatically identified in a second image based on patterns identified in the first image. In case the object point is automatically identified by the instrument, the user may be given the option to give a confirmation that the identified object point is correct before or during the aiming and measuring procedures. This is preferred for the identification of the object point in the second image.

The means for measuring image coordinates of the object point in the displayed images, and the means for determining target coordinates of the target in relation to the rotation center of the surveying instrument are preferably implemented in the form of computer program code that is executed in a processor. However, implementation may also be made in dedicated hardware, such as in a special purpose microprocessor or a digital signal processor (DSP), firmware or similar.

The means for rotating the instrument is preferably implemented in association with the servo control system for the instrument for controlled activation of the drive motors 1005 and 1008 (see FIG. 10).

While specific embodiments have been described, the skilled person will understand that various modifications and alterations are conceivable within the scope as defined in the appended claims.

The invention claimed is:

1. A method for determining three-dimensional coordinates of a target that is located remote from a surveying instrument, the three-dimensional coordinates determined in relation to the surveying instrument, the surveying instrument comprising a first camera in a first camera position and orientation, and a second camera in a second camera position and orientation, the first camera being eccentric to a rotation center of the surveying instrument, and the second camera position being spaced from the first camera position by a distance, the method comprising:
    capturing a first image using the first camera, the first image including the target;
    selecting the target by identifying at least one object point in the first image;
    measuring first image coordinates of the at least one object point in the first image;
    capturing a second image using the second camera, the second image including the target;
    identifying, in the second image, the at least one object point identified in the first image, wherein the identifying, in the second image, includes,
        selecting a minimum distance and a maximum distance from the first camera position along an imaging ray associated with the at least one object point, the imaging ray extending outward from the first camera position toward the target, between which minimum distance and maximum distance the target is located on the imaging ray,
        determining a section of an epipolar line in the second image on which the at least one object point is located and that corresponds to the imaging ray, the section of the epipolar line determined based on the maximum distance, the minimum distance, the first camera position and orientation, the second camera position and orientation, the first image coordinates, and first and second camera calibration data, and
        identifying, along the section of the epipolar line in the second image, the at least one object point identified in the first image;
    measuring second image coordinates of the at least one object point in the second image; and
    determining the three-dimensional coordinates of the target in relation to the rotation center of the surveying instrument based on the first camera position and orientation, the first image coordinates, the second camera position and orientation, the second image coordinates, and the first and second camera calibration data.

2. The method of claim 1, further comprising:
    determining whether the epipolar line is completely inside the second image.

3. The method of claim 2, further comprising:
    rotating, if the epipolar line is not completely inside the second image, the surveying instrument around the rotation center based on epipolar line data to move the second camera to a revised second camera position and orientation in order to position the epipolar line within a revised second image;
    capturing the revised second image using the second camera in the revised second camera position and orientation; and identifying, along the section of the epipolar line in the revised second image, the at least one object point identified in the first image.

4. The method of claim 1, wherein the minimum distance is selected as the distance between the first camera position and the second camera position.

5. The method of claim 1, wherein the at least one object point is identified in the first image by operator selection.

6. The method of claim 1, wherein the at least one object point is identified in the first image by automatic image analysis.

7. The method of claim 1, wherein the at least one object point identified in the first image is identified in the second image by automatic image analysis.

8. The method of claim 1, wherein the at least one object point identified in the first image is identified in the second image by user selection.

9. The method of claim 1, wherein the first and second images are captured while the target is illuminated by way of a light source, and two further images are captured with the light source turned off, and the method includes,
   subtracting one of the two images of the first camera from the other one of the two images of the first camera in order to produce a first difference image, and
   subtracting one of the two images of the second camera from the other one of the two images of the second camera in order to produce a second difference image, and wherein,
   the selecting a target includes identifying at least one object point in the first difference image,
   the measuring first image coordinates measures first image coordinates of the at least one object point in the first difference image,
   the identifying, in the second image, identifies the at least one object point identified in the first difference image,
   the measuring second image coordinates measures second image coordinates of the at least one object point in the second difference image, and
   the determining three-dimensional coordinates of the target in relation to the rotation center of the surveying instrument determines the three-dimensional coordinates based on the first camera position and orientation, the first difference image coordinates, the second camera position and orientation, the second difference image coordinates, and first and second camera calibration data.

10. The method of claim 9, wherein said light source illuminates the target by way of a spot.

11. The method of claim 9, wherein said light source illuminates the target by way of a projected pattern.

12. The method of claim 1, wherein a number of images are captured with the two cameras in order to attain a scanning function, where an image of the first camera is processed with a corresponding image of the second camera in order to determine the three-dimensional coordinates for each pair of captured first and second images.

13. The method of claim 1, further comprising:
   determining a direction from the rotation center of the surveying instrument towards the target based on the three-dimensional coordinates.

14. The method of claim 13, further comprising:
   rotating the surveying instrument so that a line of sight of the surveying instrument is directed in the direction towards the target.

15. The method of claim 14, further comprising:
   measuring a distance to the target using distance measuring capabilities within the surveying instrument.

16. The method of claim 1, further comprising:
   determining a distance from the rotation center of the surveying instrument to the target based on the three-dimensional coordinates.

17. The method of claim 1, wherein the first image and the second image are captured simultaneously.

18. A method for determining three-dimensional coordinates of a target in relation to a surveying instrument, said method comprising:
   determining the three-dimensional coordinates using the method of claim 1 at close range,
   and
   determining the three-dimensional coordinates using an electronic distance measurement at far range.

19. The method of claim 18, wherein the close range is between about 0 to 25 meters from the target.

20. A non-transitory computer readable medium comprising a computer program product, the computer program product comprising computer program code portions configured to perform the method of claim 1 when executed in a computer.

21. A surveying instrument for determining three-dimensional coordinates of a target in relation to the surveying instrument, comprising:
   a first camera configured to capture images from a first position and orientation, the first camera being eccentric to a rotation center of the surveying instrument;
   a second camera configured to capture images from a second position and orientation, the second camera position being spaced from the first camera position by a distance;
   a display configured to display images captured by the first camera and the second camera;
   at least one device configured to identify at least one object point corresponding to target in the displayed images;
   at least one device configured to measure first image coordinates of the at least one object point in a first image captured by the first camera:
   at least one device configured to measure second image coordinates of the at least one object point in a second image captured by the second camera, wherein the at least one device configured to identify the at least one object point is configured to,
     select a minimum distance and a maximum distance from the first camera position along an imaging ray associated with the at least one object point, the imaging ray extending outward from the first camera position toward the target, between which minimum distance and maximum distance the selected target is located on the imaging ray,
     determine a section of an epipolar line in the second image on which the at least one object point is located and that corresponds to the imaging ray, the section of the epipolar line determined based on the maximum distance, the minimum distance, the first camera position and orientation, the second camera position and orientation, the first image coordinates, and first and second camera calibration data, and
     identify, along the section of the epipolar line in the second image, the at least one object point identified in the first image;
   at least one device configured to determine the three-dimensional coordinates of the target in relation to the rotation center of the surveying instrument based on the first camera position and orientation, the first image coordinates, the second camera position and orientation, the second image coordinates, and the first and second camera calibration data.

22. The instrument of claim 21, wherein the at least one device configured to identify an object point is implemented as a cursor movable across the displayed images.

23. The instrument of claim 21, wherein the display is a touch display, and the at least one device configured to identify an object point is implemented using the touch display, the object point being identified by clicking or tapping on the touch display.

24. The instrument of claim 21, wherein the at least one device configured to identify an object point is further implemented using image processing software.

25. The instrument of claim 21, further comprising:
at least one device configured to emit light pulses towards the selected target in order to perform electronic distance measurements.

26. The instrument of claim 21, further comprising:
at least one device configured to illuminate the selected target.

27. The instrument of claim 26, wherein the at least one device configured to illuminate the selected target is arranged coaxially with at least one device configured to emit light pulses towards the selected target.

* * * * *